United States Patent [19]

Alcidi et al.

[11] Patent Number: 5,123,498
[45] Date of Patent: Jun. 23, 1992

[54] APPARATUS FOR THE AUTOMATIC RELEASE OF A MOTOR-VEHICLE SAFETY BELT AFTER A COLLISION

[76] Inventors: Luciano Alcidi, Via M. Mercati, Firenze; Gino Grassi, Via F. Pasqui, Sesto F. No. Firenze, both of Italy

[21] Appl. No.: 618,177

[22] Filed: Nov. 26, 1990

[30] Foreign Application Priority Data

Nov. 24, 1989 [IT] Italy ................... 9569 A/89

[51] Int. Cl.⁵ ........................................ B60R 21/00
[52] U.S. Cl. ................................ 180/268; 280/806
[58] Field of Search ............... 180/268; 280/801, 806; 24/603, 656

[56] References Cited

U.S. PATENT DOCUMENTS

| | | | |
|---|---|---|---|
| 3,146,846 | 9/1964 | Gutshall | 180/269 |
| 3,963,090 | 6/1976 | Hollins | 180/268 |
| 4,553,625 | 11/1985 | Tsuge et al. | 180/268 |

FOREIGN PATENT DOCUMENTS

| | | | |
|---|---|---|---|
| 2463028 | 3/1981 | France | 180/268 |
| 134356 | 11/1986 | Japan | 180/268 |
| 82858 | 4/1988 | Japan | 180/268 |

Primary Examiner—Kenneth R. Rice
Attorney, Agent, or Firm—McGlew & Tuttle

[57] ABSTRACT

The present invention relates to an apparatus for the automatic release of a safety belt. A measuring device is used to measure the tensile force of the safety belt. Once the tensile force exceeds a limit a delay timer is started. After a predetermined time has expired the apparatus automatically releases the seat belt from a support. In one embodiment of the invention if the tensile force of the safety belt is exceeded again during the predetermined delay time the delay timer is started again from the beginning and the safety belt is only released after the predetermined delay time has expired after the last time the tensile force exceeded the limit. The apparatus also has devices for manually locking and releasing the safety belt from the support.

3 Claims, 6 Drawing Sheets

APPARATUS FOR THE AUTOMATIC RELEASE OF A MOTOR-VEHICLE SAFETY BELT AFTER A COLLISION

FIELD AND BACKGROUND OF THE INVENTION

Almost everywhere in the world, safety belts on vehicles (cars, trucks, airplanes, etc.) have become compulsory and subject to homologation by the authorities.

The are, however, fairly sound criticisms raised by some experts and drivers as to the efficiency of these protective measures. Such criticisms have been objectively subject to a study by experts' commisions and they have found that, in some unfavourable circumstances, the safety belts put on by the passengers may hamper or even prevent the passenger from leaving the vehicle after the collision. Such condition may lead to serious-or fatal consequences.

SUMMARY AND OBJECT OF THE PRESENT INVENTION

The object of the present invention is to overcome the above mentioned drawbacks. In fact, a belt provided with a mechanism according to the invention becomes automatically disengaged after a few seconds from the accident and, more precisely, after the last tug of the belt, thereby freeing the passenger.

The mechanism upon which the invention is based is very simple and easy to construct by those skilled in the art. As everybody knows, when a vehicle is involved in a crash, the belt is subjected to a tug due to the inertia of the passenger. According to the invention, such tug is detected by a transducer (electrical, mechanical or electromagnetic) which is inserted into the belt-fastening system. Accordingly, if the exerted force exceeds a predetermined threshold value a timer is activated which, after the preset time, releases (by energizing an electromagnet, for example) the belt from the anchorage.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
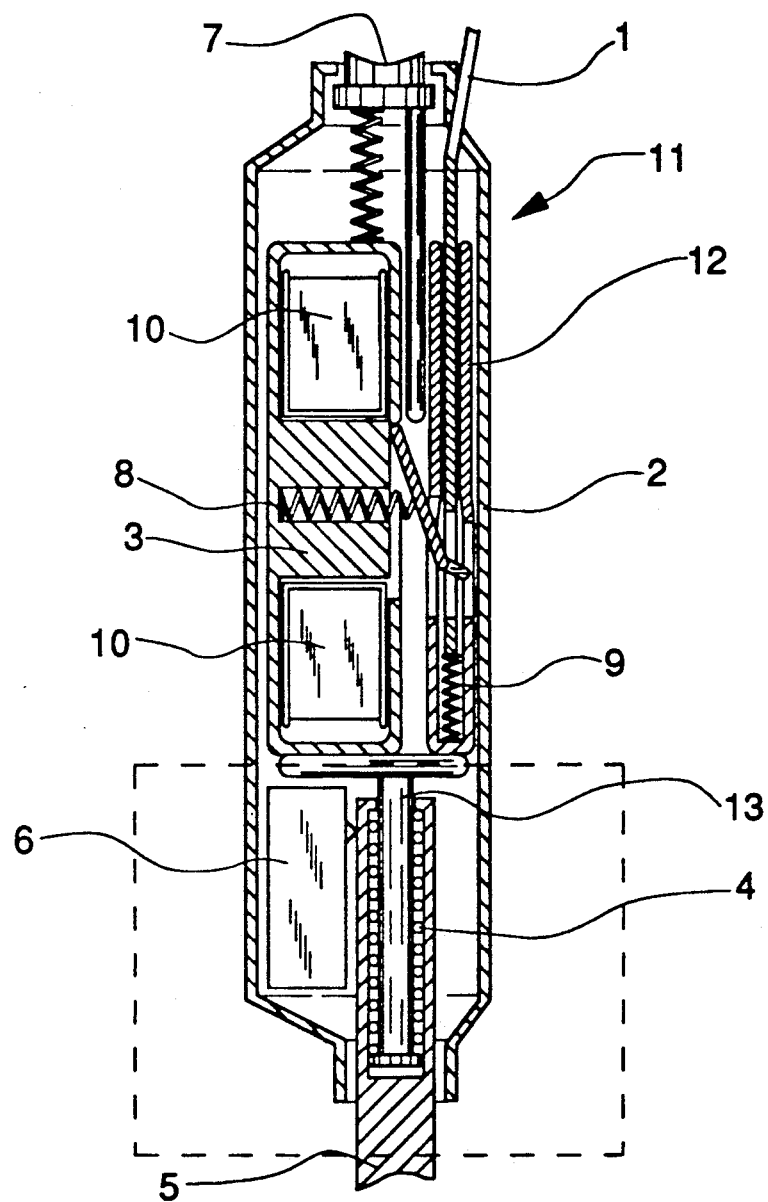
FIG. 1 is a sectional view of the locking part showing the locking part in a quiescent condition.
Figure 2:
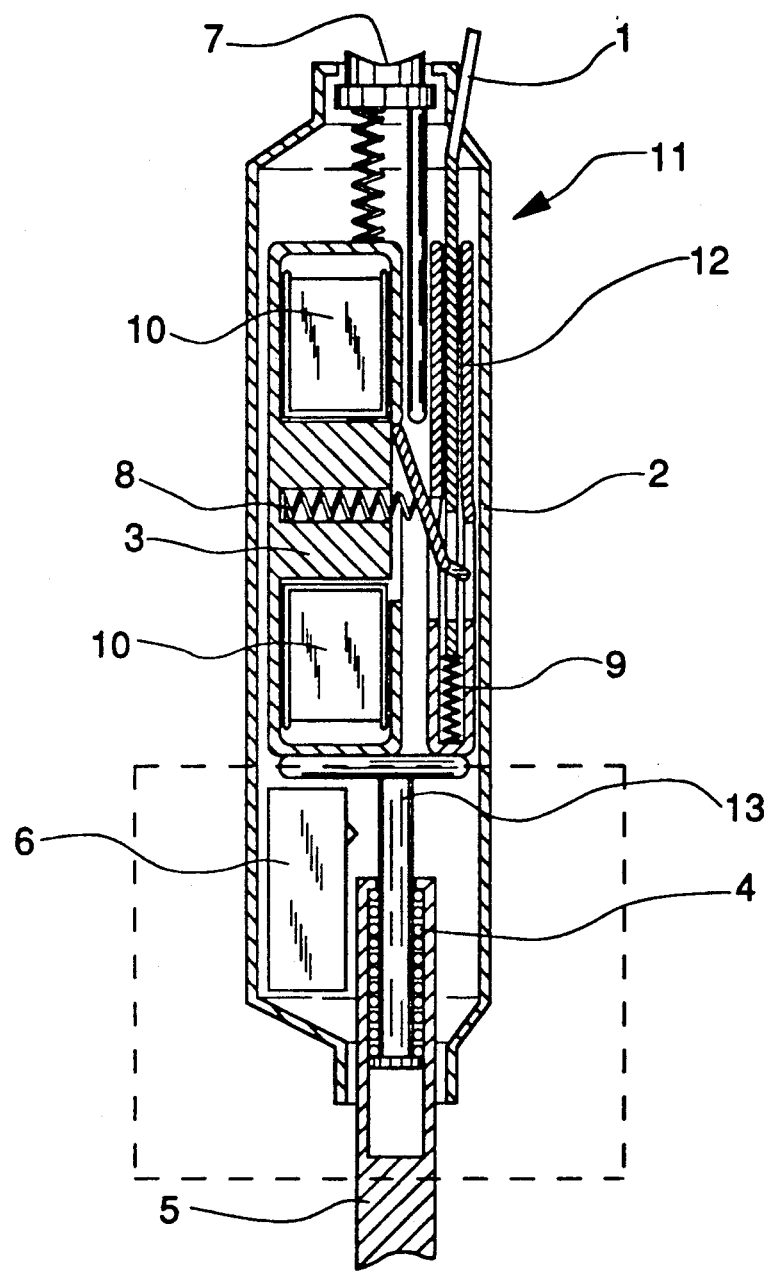
FIG. 2 is a sectional view of the locking part in an extended position.
Figure 3:
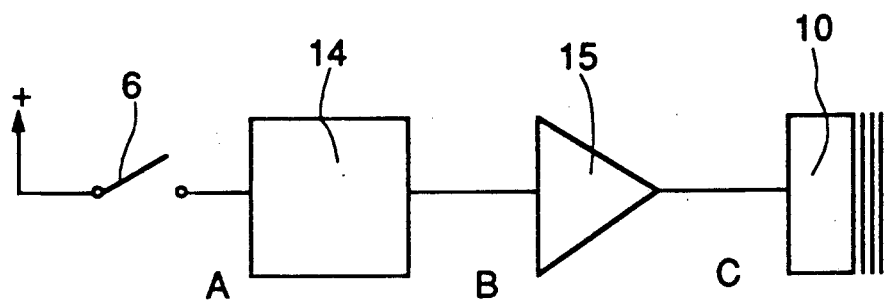
FIG. 3 shows a general schematic of the automatic release circuitry.
Figure 4:
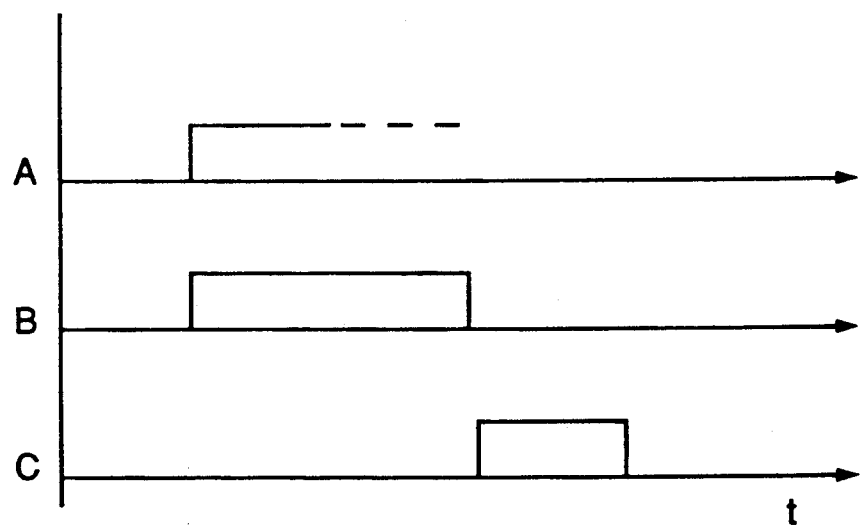
FIG. 4 is a graph of the signal lines of the circuitry of FIG. 3.

FIG. 1 shows a sectional view of the locking part, anchored to the vehicle platform, and showing how the system can work. As shown, the mechanism consists of two fixed parts: the electromagnet 3 with the hook-anchor 2, and the connector 12 which receives the buckle 1 of the movable belt. When the buckle slot is in alignment with the slots provided on the same connnector, the anchor 2—being pushed by the spring 3—fits into the buckle in such a way that this cannot be release. Both the electromagnet and the connector are integrally fixed to the piston 13 which slides within the cylinder formed in the support 5 for the anchorage to the vehicle body.

The assembly 5 and 13 together with the calibrated spring 4 and the microswitch 6, which is solid to the body of the system supporting 13 as well, makes up the simple transducer causing the proposed safety system to trigger. The spring 4 may be designed, in fact, so that the anchoring body 5 is able to move relative to the whole locking system held within a case 11 and, in particular, relative to the piston 13, only when the tensile force exceeds the tug value due to the vehicle impact. In this case, the cylinder-support 5 slides back thus allowing the microswitch 6 to change its state in order to open or close the electrical circuit.

Referring now to FIGS. 2-5, the switching of microswitch 6, here shown in a closed condition, activates the timer 14 which, after a preset time (possibly ranging from few seconds to one minute), operates the monostable 15 (or other switching system) which in turn actuates the coil 10 of the electromagnet 3, so that the anchor 2 is called back to adhere with the electromagnet and, by coming out from the slot 1, releases the belt (also aided by the spring 9) thereby freeing the passenger.

The electromagnet 3 is usually powered by the vehicle battery. However, a self-contained power supply may be provided as an auxiliary safety measure. The timer 14 will be of re-triggerable type, that is, it will be re-started every time it senses the trigger signal, thereby allowing the release of the belt only after detecting the last pull. The whole circuit, very simple and compact, may be housed within the mechanism-holding case 11.

The push-button 7, held in place by an elastic system consisting in this case of a spring, may be pressed by the passenger for releasing the belt manually. In fact, connected to the push-button 7 is a flat appendix which, by entering the space between 3 and 12, disengages the anchor 2 from the buckle slot.

The system for detecting the tug may be constructed in several ways and be located also outside the hooking system. A further example of such transducer could also be provided by a strain gauge of resistive bridge type, for example, or of inertial type with a threshold limiter which emits a signal only after the limit is exceeded. Moreover, the detection system could be inserted into any part of the vehicle so as to sense the sudden deceleration taking place in whatever direction.

EXEMPLIFYING EMBODIMENT

Disclosed herebelow is an embodiment of an electronic circuit to achieve the release of the belt.

Figure 5:
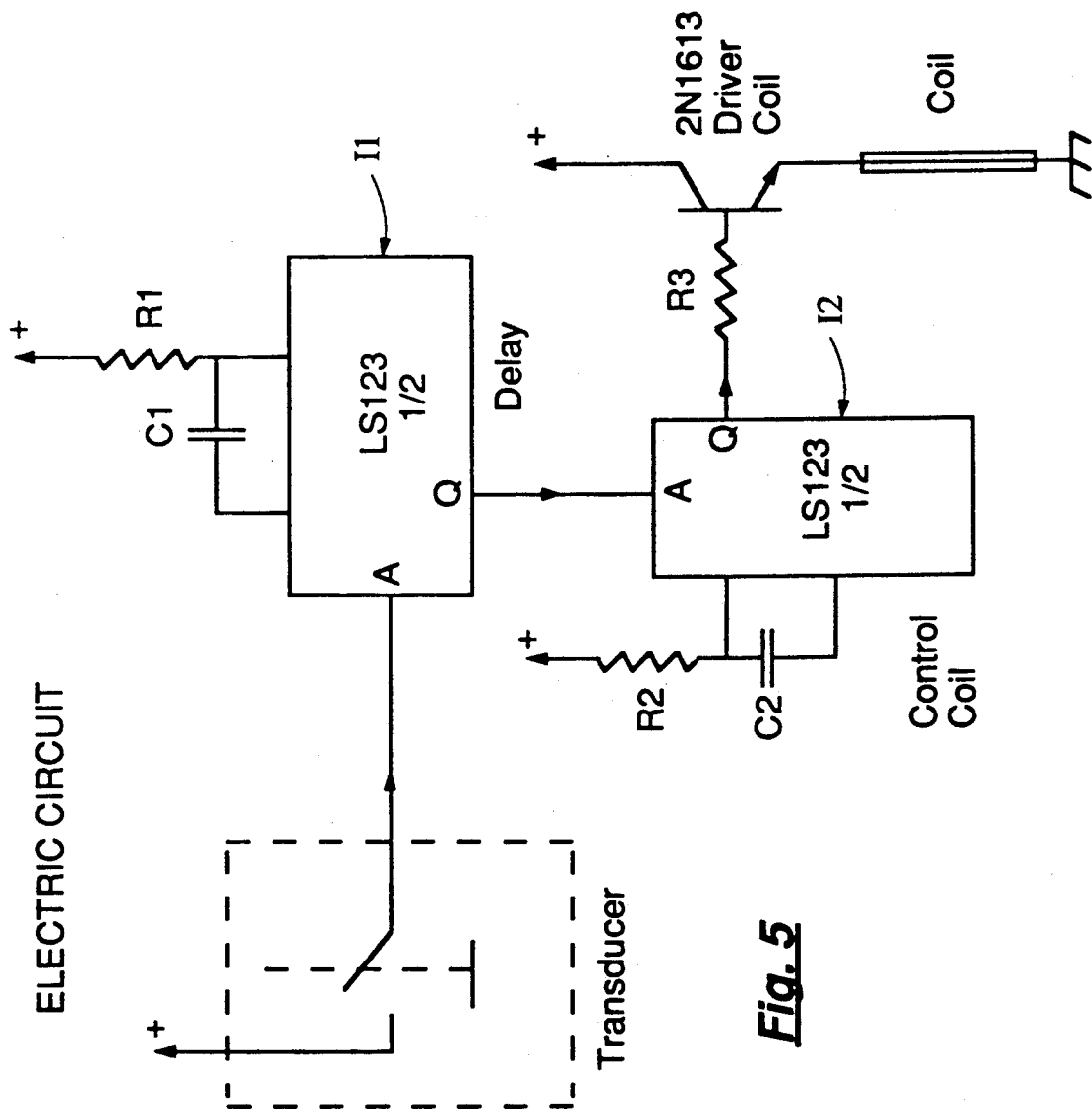
FIG. 5 is a specific embodiment of the automatic release circuitry of the invention.

With reference to FIG. 5 of the attached drawings, the circuit is made up of two monostable oscillators 11, 12 enclosed within the same LS123-type integrated circuit, and of a transistor 2N1613. The monostable 11 is of re-triggerable type to generate the preset release delay starting from the last significant tug upon the collision.

In the present embodiment, the delay has been set to 5 sec., but it may be easily changed by varying the time constant T which is defined by the value of resistance R1 and capacitor C1 according to the formula $T = R1 \cdot C1 \cdot K$, wherein $K = 0.33$.

At the end of the delay, the monostable 12 generates the release command. In fact, at its output Q a square wave is present allowing the passage, via the transistor 2N1613, of the current necessary to activate the electromagnet 3.

Figure 6:
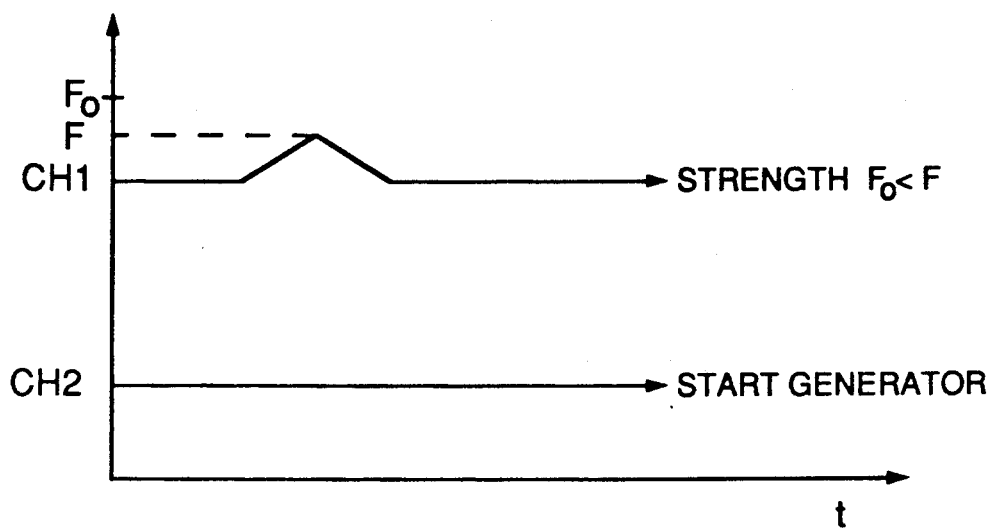
FIG. 6 is a graph of electronic signals of the automatic release circuitry when the force of a tug is less than a limit.

FIG. 6 shows the oscillogram for a tensile force F less than the calibration force Of. No start signal appears on the trace CH2.

Figure 7:
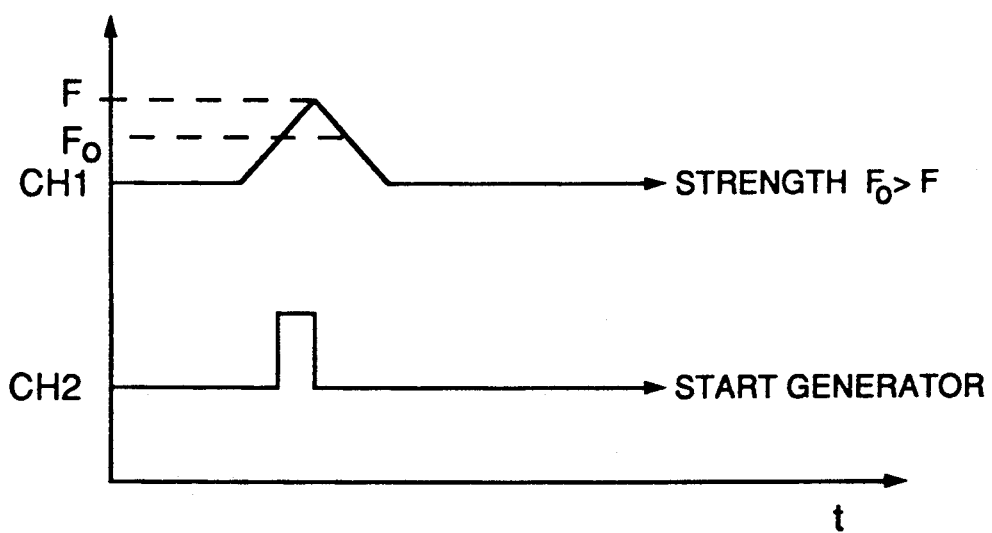
FIG. 7 is a graph of the signals of the automatic release circuitry when the force of a tug is greater than the limit.

FIG. 7 shows the oscillogram for a force F greater than the calibration force Fo. On the trace CH2, the square wave after the microswitch signal indicates to the electronic system that a tug has taken place.

Figure 8:
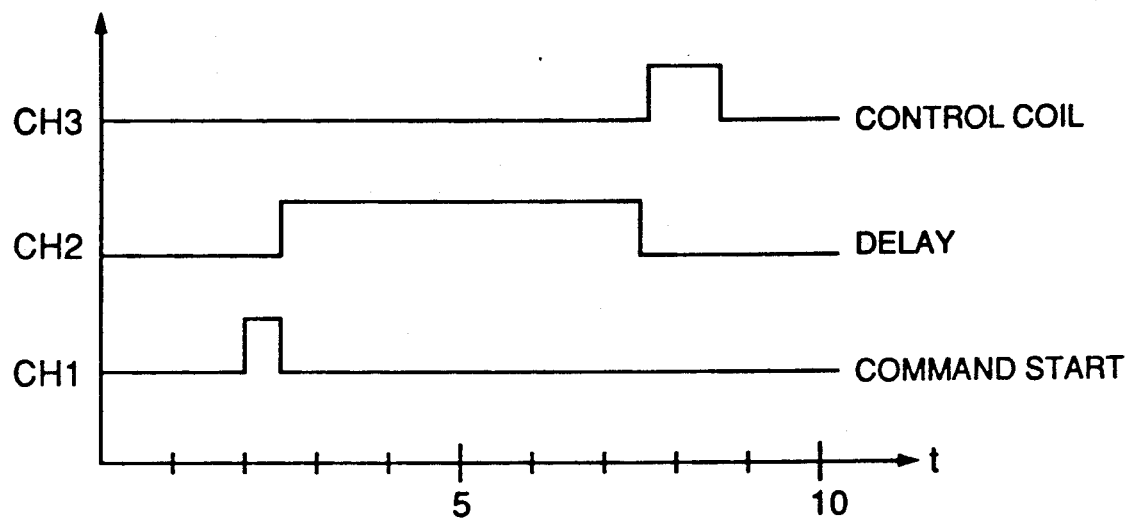
FIG. 8 is another graph of the signals of the automatic release circuitry when the automatic release circuitry has experienced one tug.

FIG. 8 shows the working logic of the electronic system. Visible on trace CH1 is the start pulse generated by the transducer. On CH2 it can be seen the 5-second delay set by the monostable 11 and on CH3 the release command pulse generated by the monostable 12.

Figure 9:
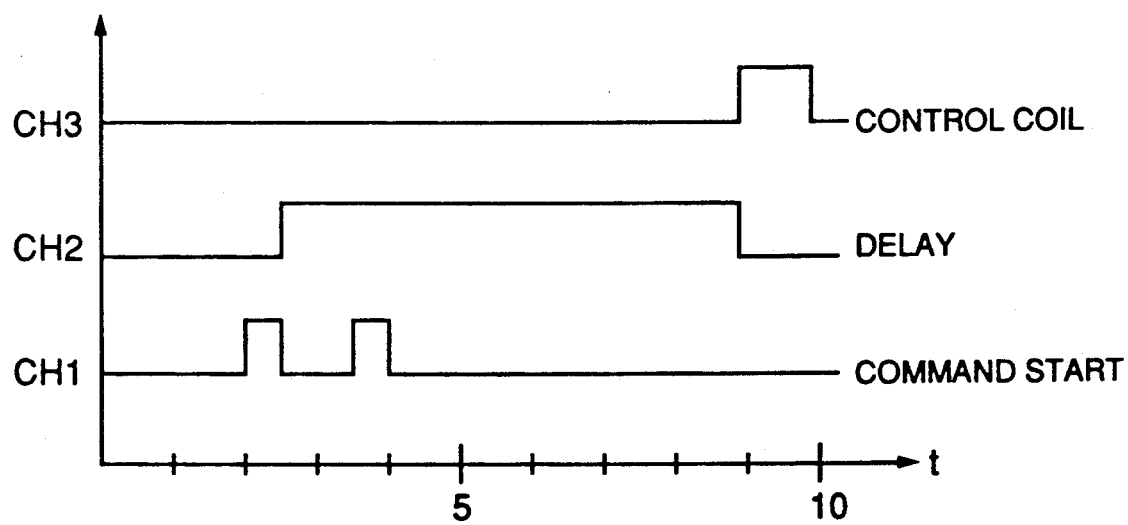
FIG. 9 is a graph of the signals of the automatic release circuitry when the automatic release circuitry has received two tugs.

FIG. 9 shows how the electronic circuit works in case of two tugs taking place in a rapid succession. The transducer generates two start pulses (visible on CH1), the monostable 11 being re-triggered by the second start pulse, that is, with a total delay of 7 seconds, but always 5 seconds after the second pulse. Visible on trace CH3 is the release command pulse.

While specific embodiments of the invention have been shown and described in detail to illustrate the application of the principles of the invention, it will be understood that the invention may be embodied otherwise without departing from such principles.

We claim:

1. An apparatus for the automatic release of a safety belt, the apparatus comprising:
   a strain-gauge transducer of one of a resistive bridge type and an interial type, said strain-gauge transducer detecting intensity of belt tensile force and emitting a start signal when a preset limit has been exceeded;
   a timer means for measuring a predetermined time interval after receiving said start signal from said strain-gauge transducer;
   locking/releasing means for locking and releasing the safety belt relative to and from a holding case, said holding case connected to a support;
   retaining means for retaining said locking/releasing means in a locked-buckle condition;
   activating means for activating said locking/releasing means and achieving a release-buckle condition with an interlock with said timer means; and
   automatic release means for automatically releasing the safety belt form said holding case.

2. An apparatus for the automatic release of a safety belt, the apparatus comprising:
   means for detecting intensity of belt tensile force and emitting a start signal when a present limit has been exceeded;
   locking-releasing means for locking and releasing the safety belt relative to and from a holding case, said holding case connected to a support;
   retaining means for retaining said locking/releasing means in a locked-buckle condition;
   activating means for activating said locking/releasing means and achieving a released-buckle condition with an interlock with said timer means;
   an electronic circuit receiving said start signal from said means for detecting said belt tensile force, said electronic circuit having a first monostable oscillator for producing a delay time signal and a second monostable oscillator for producing a release command, said first and second monostable oscillators being included in an integrated circuit of LS123 type, and a transistor of 2N1613 type; and
   automatic release means for automatically releasing the safety belt from said holding case.

3. An apparatus according to claim 2, wherein:
   said electronic circuit is retriggerable through a fixed resistance and a fixed capacitor whose values determine a length of said delay signal.

* * * * *